United States Patent

Hirose

(10) Patent No.: US 10,134,512 B2
(45) Date of Patent: Nov. 20, 2018

(54) CERAMIC MATERIAL AND RESISTIVE ELEMENT

(71) Applicant: Murata Manufacturing Co., Ltd., Nagaokakyo-shi, Kyoto-fu (JP)

(72) Inventor: Sakyo Hirose, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/823,664

(22) Filed: Nov. 28, 2017

(65) Prior Publication Data

US 2018/0082770 A1 Mar. 22, 2018

Related U.S. Application Data

(63) Continuation of application No. PCT/JP2016/066560, filed on Jun. 3, 2016.

(30) Foreign Application Priority Data

Jun. 4, 2015 (JP) .................. 2015-114131

(51) Int. Cl.
H01C 7/10 (2006.01)
H01C 7/02 (2006.01)
(Continued)

(52) U.S. Cl.
CPC ............ *H01C 7/023* (2013.01); *C04B 35/00* (2013.01); *H01C 7/008* (2013.01); *H01C 7/043* (2013.01)

(58) Field of Classification Search
CPC ................... H01C 7/023; H01C 7/008
(Continued)

(56) References Cited

U.S. PATENT DOCUMENTS 6,054,403 A * 4/2000 Kawase .................. C04B 35/50
252/521.1
2011/0027587 A1* 2/2011 Poulain .................. H01C 7/043
428/402
(Continued)

FOREIGN PATENT DOCUMENTS

EP 0 723 276 A2 7/1996
JP 08-198674 A 8/1996
(Continued)

OTHER PUBLICATIONS

JP 2005-051103, Terasaki et al., Feb. 2005. Machine translation.*
Official Communication issued in International Patent Application No. PCT/JP2016/066560, dated Aug. 9, 2016.

*Primary Examiner* — Kyung Lee
(74) *Attorney, Agent, or Firm* — Keating & Bennett, LLP

(57) ABSTRACT

A ceramic material has a composition represented by $Ca_{x'}Na_xMn_{y'}M_yO_{12}$, wherein M denotes at least one of Ni and Cu, and x', x, y', and y satisfy any of (a), (b), and (c) in which x'+x=X and y'+y=Y:

$$\frac{0.9}{7.0} \leq \frac{X}{Y} < \frac{1.0}{7.0}; \quad (a)$$

at a condition of $$\frac{X}{Y} = \frac{1.0}{7.0}, \frac{0.03}{8} \leq \frac{x}{X+Y} < \frac{0.30}{8} \text{ and} \quad (b)$$

$$0 \leq \frac{y}{X+Y} \leq \frac{0.35}{8}; \text{ and}$$

(Continued)

-continued $$\frac{1.0}{7.0} < \frac{X}{Y} \leq \frac{1.0}{6.9}. \tag{c}$$

12 Claims, 6 Drawing Sheets

(51) Int. Cl.
*C04B 35/00* (2006.01)
*H01C 7/00* (2006.01)
*H01C 7/04* (2006.01)

(58) Field of Classification Search
USPC .................................................. 338/22 R, 13
See application file for complete search history.

(56) References Cited

U.S. PATENT DOCUMENTS

| | | | |
|---|---|---|---|
| 2011/0215894 A1* | 9/2011 | Kishimoto | C04B 35/4682 338/22 R |
| 2013/0221475 A1* | 8/2013 | Hirose | H01C 7/04 257/467 |
| 2017/0226018 A1* | 8/2017 | Fujita | C04B 35/495 |

FOREIGN PATENT DOCUMENTS

| | | |
|---|---|---|
| JP | 2005-051103 A | 2/2005 |
| WO | 2012/056797 A1 | 5/2012 |

\* cited by examiner

CERAMIC MATERIAL AND RESISTIVE ELEMENT

CROSS REFERENCE TO RELATED APPLICATIONS

This application claims the benefit of priority to Japanese Patent Application No. 2015-114131 filed on Jun. 4, 2015 and is a Continuation Application of PCT Application No. PCT/JP2016/066560 filed on Jun. 3, 2016. The entire contents of each application are hereby incorporated herein by reference.

BACKGROUND OF THE INVENTION

1. Field of the Invention

The present invention relates to a ceramic material and a resistive element including the ceramic material.

2. Description of the Related Art

Modules and motors handling large currents are recently used in electric vehicles, hybrid vehicles, etc., which are becoming increasingly popular. In these modules etc., when an inrush current occurs at power-on (or at a start of a motor) and the inrush current excessively flows through the modules etc., electronic components and ICs therein may be damaged or destroyed, and this must therefore be dealt with. For example, an inrush current generated at a start of a motor of an electric vehicle may reach several hundred amperes, so that it is required to sufficiently suppress the inrush current. A use of a thermistor element is being studied as a countermeasure against such an inrush current.

An NTC (negative temperature coefficient) thermistor is conventionally known as an inrush-current suppressing thermistor element. The NTC thermistor for suppressing an inrush current is generally an element having a room-temperature resistance of a little less than 10Ω and made of an NTC thermistor material having a room-temperature specific resistance of about several hundreds to several thousands of Ω·cm. However, such NTC thermistors with a small specific resistance do not have a sufficiently large resistance change (that may be evaluated by a B-constant) between a low temperature state and a high temperature state and have drawbacks, such as a relatively large power loss due to a residual resistance while a steady current flows (ON state, high-temperature state). On the other hand, those with a large specific resistance have a large resistance change (B-constant) between a low temperature state and a high temperature state. However, an element size problematically must increase in order to reduce the element resistance. This is because a positive correlation generally exists between a specific resistance of a conductive material and the B-constant, and when the specific resistance is reduced, the B-constant becomes smaller, so that a low specific resistance and a high B-constant are difficult to achieve at the same time. This problem becomes more apparent in applications requiring elements with lower resistance, and conventionally known NTC thermistor materials result in an extremely large element size and are difficult to use due to problems of mounting, for example.

Therefore, studies have been conducted for using a CTR (critical temperature resistor) as the inrush-current suppressing thermistor. The CTR has characteristics (hereinafter simply referred to as "CTR characteristics") exhibiting a steep resistance decrease at a certain temperature or in a temperature range (transitioning from an insulator to a metal state) when the temperature is raised, and has an extremely large B-constant as compared to NTC thermistors, in which the resistance gradually decreases as a temperature rises.

A ceramic material proposed as a ceramic material having the CTR characteristics has a structure represented by a chemical formula $R1_{1-x}R2_xBaMn_2O_6$, and is characterized as follows:

(1) when R1 is composed of Nd and R2 is composed of at least one of Sm, Eu, and Gd, x satisfies $0.05 \leq x \leq 1.0$;

(2) when R1 is composed of Nd and R2 is composed of at least one of Tb, Dy, Ho, Er, and Y, x satisfies $0.05 \leq x \leq 0.8$;

(3) when R1 is composed of at least one of Sm, Eu, and Gd and R2 is composed of at least one of Tb, Dy, Ho, and Y, x satisfies $0 \geq x \leq 0.4$; and (4) when R1 is composed of at least one of Sm, Eu, and Gd and R2 is composed of at least one selected from the remainder not selected as R1 out of Sm, Eu, and Gd, x satisfies $0 \leq x \leq 1.0$ (see WO 2012/056797).

The ceramic material described in WO 2012/056797 is an A-site-ordered Mn compound in which a rare-earth element and barium entering the A site of the perovskite structure are ordered, and exhibits the CTR characteristics. It is described in WO 2012/056797 that this ceramic material exhibits a steep resistance change at around 100° C. as shown in FIG. 2 of WO 2012/056797, for example, and is suitable for an inrush-current suppressing thermistor element.

An inrush-current suppressing thermistor element, or particularly, a thermistor element for high-power application, desirably has a low room-temperature specific resistance as compared to an inrush-current suppressing element that is made using a conventional NTC thermistor material. If the room-temperature specific resistance of the ceramic material used to make the inrush-current suppressing thermistor element is too high, an element is increased in size (increased in area and made thinner) so as to achieve a required resistance level for the element, causing a major problem in practical use due to a reduction in mechanical strength and an increase in mounting area. For functioning as an inrush-current countermeasure element, self-heating must occur due to the inrush current so that the element reaches the temperature of the steady state and enters the ON state (achieves a low resistance). However, since the large element size leads to a large heat capacity as well as a large heat dissipation area, the responsiveness to the inrush current decreases, or an insufficient rise in temperature results in a high resistance in the on-state and a large power consumption, which is not acceptable.

Furthermore, to effectively suppress the inrush current over a relatively wide temperature range from a low temperature to the transition temperature and minimize the power consumption by the thermistor element while the steady current flows, it is desirable that the inrush-current suppressing thermistor element exhibits a steep resistance change (i.e., large B-constant) due to a temperature rise and that the temperature (transition temperature) causing the element to exhibit this steep resistance change is within a range of 80° C. to 180° C.

As a result of studies by the inventor of the present invention, it was discovered that although the ceramic material described in WO 2012/056797 has a room-temperature specific resistance at an acceptably low level for the inrush-current suppressing thermistor element and exhibits a steep resistance change (decrease) due to a temperature rise, the resistance is increased by a heat cycle test.

If a thermistor element is used for suppressing an inrush power, the element has a lower resistance because of an increase in temperature due to self-heating at the time of power-on when the inrush current occurs, and has a higher resistance because of a decrease in temperature at the time of power-off, so that a history of temperature transition between a low temperature state and a high temperature state is repeated in practical use. Therefore, the increased resistance value revealed by the heat cycle test may also be generated in actual use, which may cause a malfunction of a module.

Therefore, the ceramic material described in WO 2012/056797 is inferior in terms of reliability (heat cycle resistance) and is not necessarily satisfactory as a material for the inrush-current suppressing thermistor element.

SUMMARY OF THE INVENTION

Preferred embodiments of the present invention provide novel ceramic materials having CTR characteristics as materials that have a room-temperature specific resistance at an acceptably low level, that exhibit a steep resistance change due to a temperature rise, and that achieve excellent reliability.

The inventor of preferred embodiments of the present invention focused attention on $CaMn_7O_{12}$, which is one of the ceramic materials having CTR characteristics. $CaMn_7O_{12}$ transitions from an insulator to a metal state at around 180° C. and exhibits a steep resistance change (see Sample No. 1 of Experimental Example described later and FIG. 2). $CaMn_7O_{12}$ has a perovskite structure represented by $ABO_3$ and has Ca or Mn located in the A site and Mn located in the B site.

However, as a result of studies by the inventor of preferred embodiments of the present invention, it was discovered that $CaMn_7O_{12}$ has a higher specific resistance at room temperature than the ceramic material described in WO 2012/056797 and has a drawback that the addition of Cu to control the transition temperature (shifting to a lower temperature) degrades the steepness of resistance change (makes the B-constant smaller). It was also discovered that, similar to the ceramic material described in WO 2012/056797, $CaMn_7O_{12}$ has the resistance increased by a heat cycle test. It was discovered that, although the addition of Cu makes the CTR characteristics indistinct, a lower specific resistance and a higher B-constant is able to be acquired as compared to generally used NTC thermistor materials of Mn-based spinel compounds. However, $CaMn_7O_{12}$ has a problem of the resistance increased by a heat cycle test and cannot preferably be used as a thermistor material with a low resistance and a high B-constant.

As a result of intensive studies on a ceramic material based on $CaMn_7O_{12}$, the inventor of preferred embodiments of the present invention discovered that the addition of Na thereto (more specifically, the substitution of a portion of Ca with Na) and/or an adjustment of a composition ratio into a predetermined range reduces a specific resistance at room temperature to an acceptable level, enables maintenance of the steepness of the resistance change, and improves a heat cycle resistance, and thus, the preferred embodiments of the present invention were conceived of and developed as a result of further examinations.

A preferred embodiment of the present invention provides a ceramic material having a composition represented by the following formula:

$$Ca_{x'}Na_xMn_{y'}M_yO_{12}$$

wherein M denotes at least one of Ni and Cu, and x', x, y', and y satisfy any of the following formulae (a), (b), and (c) in which x'+x=X and y'+y=Y:

$$\frac{0.9}{7.0} \leqq \frac{X}{Y} < \frac{1.0}{7.0}; \quad (a)$$

at a condition of $$\frac{X}{Y} = \frac{1.0}{7.0}, \frac{0.03}{8} \leqq \frac{x}{X+Y} < \frac{0.30}{8} \text{ and} \quad (b)$$

$$0 \leqq \frac{y}{X+Y} \leqq \frac{0.35}{8}; \text{ and}$$

$$\frac{1.0}{7.0} < \frac{X}{Y} \leqq \frac{1.0}{6.9}. \quad (c)$$

Another preferred embodiment of the present invention provides a ceramic material composed of a composite oxide of Ca, Na, Mn, and M (M represents at least one of Ni and Cu), wherein where x', x, y', and y denote a Ca-containing molar portion, an Na-containing molar portion, an Mn-containing molar portion, and an M-containing molar portion, respectively, and x'+x=X and y'+y=Y, the ceramic material satisfies any of the following formulae (a), (b), and (c):

$$\frac{0.9}{7.0} \leqq \frac{X}{Y} < \frac{1.0}{7.0}; \quad (a)$$

at a condition of $$\frac{X}{Y} = \frac{1.0}{7.0}, \frac{0.03}{8} \leqq \frac{x}{X+Y} < \frac{0.30}{8} \text{ and} \quad (b)$$

$$0 \leqq \frac{y}{X+Y} \leqq \frac{0.35}{8}; \text{ and}$$

$$\frac{1.0}{7.0} < \frac{X}{Y} \leqq \frac{1.0}{6.9}. \quad (c)$$

Such ceramic materials according to preferred embodiments of the present invention exhibit a sufficiently low room-temperature specific resistance as compared to $CaMn_7O_{12}$. Additionally, such a ceramic material exhibits CTR characteristics and shows a steep resistance change (decrease) due to a temperature rise even when Ni and/or Cu are contained therein. Furthermore, even when such a ceramic material is subjected to a heat cycle test, an increase in resistance is effectively prevented so that excellent reliability (heat cycle resistance) is able to be achieved.

Another preferred embodiment of the present invention provides a resistive element including an element body; and at least two electrodes provided with at least a portion of the element body interposed therebetween, wherein the element body is composed of any of the ceramic materials described above.

In a preferred embodiment of the present invention, the resistive element may preferably be used as a thermistor element to significantly reduce or prevent an inrush current.

Although not intended to limit the present invention, in a resistive element according to a preferred embodiment of the present invention, the element body preferably defines a plate shape, and the two electrodes are provided on respective principal surfaces of the plate-shaped element body to be opposed to each other.

Preferred embodiments of the present invention provide novel ceramic materials having CTR characteristics as materials that have a room-temperature specific resistance at an acceptably low level, that exhibit a steep change (decrease) in resistance due to a temperature rise, and that achieve excellent reliability (more specifically, heat cycle resistance).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
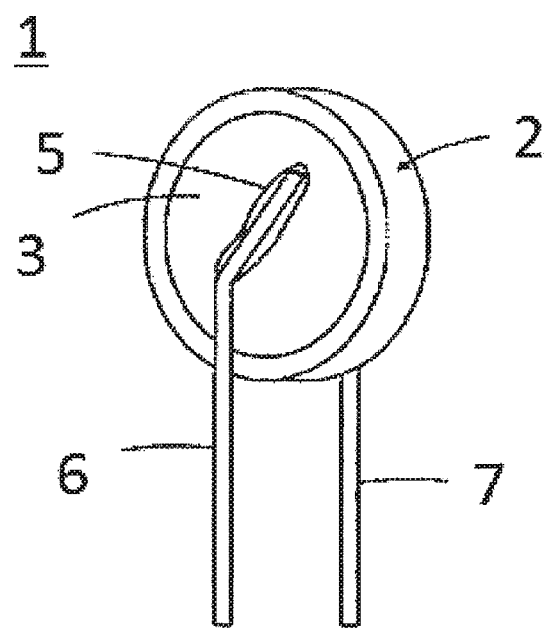
FIG. 1 is a perspective view of a resistive element according to a preferred embodiment of the present invention.

Ceramic materials and resistive elements including the ceramic material according to preferred embodiments of the present invention will be described in detail with reference to the drawings.

In a preferred embodiment of the present invention, a ceramic material has a composition represented by the following formula:

$$Ca_{x'}Na_xMn_{y'}M_yO_{12}$$

wherein M denotes at least one of Ni and Cu, and x', x and y', y satisfy any of the following formulae (a), (b), and (c) in which x'+x=X and y'+y=Y:

$$\frac{0.9}{7.0} \leq \frac{X}{Y} < \frac{1.0}{7.0}; \quad \text{(a)}$$

at a condition of

$$\frac{X}{Y} = \frac{1.0}{7.0}, \frac{0.03}{8} \leq \frac{x}{X+Y} < \frac{0.30}{8} \text{ and} \quad \text{(b)}$$

$$0 \leq \frac{y}{X+Y} \leq \frac{0.35}{8}; \text{ and}$$

$$\frac{1.0}{7.0} < \frac{X}{Y} \leq \frac{1.0}{6.9}. \quad \text{(c)}$$

Alternatively, the ceramic material may preferably be a ceramic material composed of a composite oxide of Ca, Na, Mn, and M (M denotes at least one of Ni and Cu), and where x', x, y', and y denote a Ca-containing molar portion, an Na-containing molar portion, an Mn-containing molar portion, and an M-containing molar portion, respectively, and x'+x=X and y'+y=Y, the ceramic material may satisfy any of the formulae (a), (b), and (c) described above.

The composition of such a ceramic material is able to be identified by a method known in the art. For example, the composition is able to be identified by inductively coupled plasma atomic emission spectrophotometry (ICP-AES), inductively coupled plasma mass spectrometry (ICP-MS), an X-ray fluorescence analyzer (XRF), etc.

The ceramic material has CTR characteristics and transitions from an insulator to a metallic state in a range of about 80° C. to about 180° C. to exhibit a steep resistance change (decrease) when the temperature is raised. This ceramic material has a perovskite structure represented by $ABO_3$, or more specifically, an A-site-ordered perovskite structure, and has Ca, Na (if present), or Mn located in the A site and Mn or M (if present) located in the B site. Mn located in the A site is a trivalent manganese element and Mn located in the B site is considered as being in a state in which a trivalent manganese element and a tetravalent manganese element are mixed. When Na and/or M are present, Na may be understood as an element substituting a portion of Ca, and M may be understood as an element substituting a portion of one or both of Mn of the A site and Mn of the B site.

The ceramic material has a lower room-temperature specific resistance than $CaMn_7O_{12}$. Although preferred embodiments of the present invention are not bound to any theory, at a condition of X/Y=1.0/7.0, this is considered as an effect of the addition of Na. At a condition of X/Y=1.0/7.0, x/(X+Y) may be about 0.03/8 or more and less than about 0.3/8 with respect to x indicative of an amount of Na and, and within this range, the lower limit is preferably about 0.05/8 or more, and more preferably about 0.1/8 or more, and the upper limit is preferably about 0.2/8 or less, for example. It is also considered that the same or similar effect is able to be achieved by shifting X/Y away from 1.0/7.0 within a predetermined range. For example, X/Y may be in the range of about 0.9/7.0 or more to about 1.0/6.9 or less, excluding 1.0/7.0.

More specifically, the specific resistance of the ceramic material at about 28° C. is, for example, about 50 Ω·cm or less, and preferably about 10 Ω·cm or less. This increases a degree of freedom in design of a device size (shape) so that the element is able to be relatively easily produced. Consequently, the responsiveness to an inrush current is improved and the inrush current is effectively suppressed although the present invention is not limited to such an application.

As described above, the ceramic material exhibits a steep resistance change (decrease) due to temperature change. The steepness of resistance change due to temperature change is able to be evaluated with the B-constant calculated by the following equation as an index.

$$B\text{-constant} = \ln(R_1/R_2)/(1/T_1 - 1/T_2) \quad (1)$$

In the equation, $R_1$ and $R_2$ represent resistance values (Ω) at temperatures (K) of $T_1$ and $T_2$, respectively.

When the resistance value of the ceramic material is measured at intervals of about 5° C., the maximum value of the B-constant acquired based on the equation described above with $T_2=T_1+5°$ C. is about 2000 or more, preferably about 10000 or more, and more preferably about 20000 or more, for example. Consequently, the inrush current is able to be effectively suppressed, and a power loss due to a residual resistance is able to be effectively reduced while the steady current flows (in the ON state).

As described above, the ceramic material transitions from an insulator to a metal state in the range of about 80° C. to about 180° C. Although preferred embodiments of the present invention are not bound to any theory, at a condition of X/Y=1.0/7.0, it is considered that such a transition temperature is able to be controlled by the addition of M, for example, at least one of Ni and Cu. At a condition of X/Y=1.0/7.0, x/(X+Y) may be 0 or more and about 0.35/8 or less with respect to y indicative of an amount of M and, in this range, the lower limit is preferably about 0.05/8 or more, and more preferably about 0.1/8 or more, and the upper limit is preferably about 0.2/8 or less, for example. It is also considered that the same or similar effect is able to be acquired by shifting X/Y away from about 1.0/7.0 within a predetermined range. X/Y may preferably be in the range of about 0.9/7.0 or more to about 1.0/6.9 or less, excluding 1.0/7.0, for example. The transition temperature is able to be shifted to a lower temperature by the addition of M and is preferably able to be set to about 150° C. or lower, for example. Consequently, a transition (or trip) to a low resistance state is able to promptly be made after effectively suppressing the inrush current and a power loss due to a residual resistance is able to be effectively reduced while the steady current flows. If the ceramic material contains both Cu and Ni as M, y indicative of an amount of M is the sum of an amount of Cu $(y_1)$ and an amount of Ni $(y_2)$.

Furthermore, a resistance change is effectively prevented before and after a heat cycle test, and the ceramic material exhibits a high heat cycle resistance and achieves excellent reliability. More specifically, for example, even when the material is subjected to a heat cycle test in a temperature range of about −25° C. to about 180° C., a resistance change rate is able to be made equal to or less than about 10% before and after the test, for example.

The ceramic material may be manufactured by appropriately combining methods known in the technology field of composite oxides.

In general, the ceramic material may be manufactured by weighing a material containing calcium and oxygen (e.g., oxide, carbonate, and hydroxide, the same applies hereinafter) as a Ca source, a material containing sodium and oxygen as an Na source, if present, a material containing manganese and oxygen as an Mn source, and a material containing nickel and/or copper and oxygen as an M source, if present, to a desired ratio, and mixing and firing these materials (together with a binder and other ingredients, as needed).

The ceramic material may be used for any application and may preferably be used to provide a resistive element. More specifically, the ceramic material may be used for an element body in a resistive element including the element body and at least two electrodes provided with at least a portion of the element body interposed therebetween. Particularly, such a resistive element may suitably be used as a thermistor element that suppresses an inrush current.

Such a resistive element may have any suitable shape and structure. Illustratively, as shown in FIG. 1, a resistive element 1 includes a plate-shaped (disc-shaped in the example shown in FIG. 1, although this is not a limitation) element body 2 made of the ceramic material described above and a pair of electrodes respectively provided on opposite principal surfaces of the element body 2. In FIG. 1, only one electrode 3 is shown. The other electrode not shown is provided so as to be opposed to the shown electrode 3. A lead wire 6 may preferably be connected to the one shown electrode 3 via a solder 5, for example, and a lead wire 7 may preferably be connected to the other electrode not shown via solder in the same or similar manner. This resistive element 1 may be mounted on a wiring board not shown via the lead wires 6 and 7, and is preferably used as a thermistor element that significantly reduces or prevents an inrush current, i.e., a power thermistor.

EXAMPLES

The ceramic materials and the resistive elements according to preferred embodiments of the present invention will hereinafter be described in more detail based on experimental examples.

Experimental Example 1

This experimental example relates to the case where X=1.0 and Y=7.0, and therefore, X/Y=1.0/7.0. In other words, the ceramic materials have a composition represented by $Ca_{1-x}Na_xMn_{2-y}M_yO_{12}$ (stoichiometric composition, i.e., ideal composition).

For evaluation of electrical characteristics and reliability, samples of ceramic materials were produced by the following method.

For raw materials, 99.9% or more of manganese oxide $(Mn_3O_4)$, calcium carbonate $(CaCO_3)$, copper oxide (CuO), sodium carbonate $(Na_2CO_3)$, and nickel oxide (NiO) were used. These raw materials were weighed so as to achieve the compositions shown in Tables 1 to 3 after firing and were put into a 500 ml pot container together with partially stabilized zirconium oxide (PSZ) balls having a diameter of about 2 mm, pure water, and a dispersing agent and pulverized and mixed for about 16 hours. The resulting slurry was dried, granulated, and calcined for about four hours at about 900° C. in the atmosphere. The resulting calcined powder as well as an organic solvent and a dispersing agent added thereto were subjected to a pulverization and mixing treatment as a slurry for about 16 hours using PSZ balls, and a plasticizer and an organic binder were added thereto and further mixed for about six hours to prepare a slurry for sheet formation. The slurry prepared in this manner was formed into a green sheet by a doctor blade method, cut into a strip shape, and laminated and pressure-bonded to produce a block (green body). Subsequently, the block was cut such that a size of about 5 mm×about 5 mm×about 0.8 mm is obtained after firing, and was subjected to a debindering treatment by heating at about 450° C. in the atmosphere and subsequently fired at about 950° C. to about 980° C. for about four hours. An Ag paste was applied to opposite principal surfaces of a sintered body acquired in this manner and baked by heat treatment at about 750° C. for about ten minutes to form electrodes. In this manner, samples each including a pair of electrodes were acquired for electric evaluation.

The electrical characteristics of the samples produced as described above were evaluated as described below.

Temperature dependence of resistance was evaluated with a four-terminal method using a resistance measuring device (Keithley 2430) and a temperature bath (manufactured by Despatch). The temperature range was from room temperature (about 28° C.) to about 200° C. The specific resistance was calculated from the measured resistance value and the B-constant was calculated based on Eq. (1) described above from the temperature dependence of the resistance value measured at intervals of about 5° C. In this experimental example, when the specific resistance at room temperature (about 28° C.) is about 50 Ω·cm or less and the B-constant is about 2000 or more in the temperature range in which an abrupt resistance change occurs, the samples were determined as having a small specific resistance and high steepness of resistance change and were judged acceptable. Tables 1 to 3 show the specific resistance at room temperature (about 28° C.) and the B-constant in the temperature range in which an abrupt resistance change occurs.

Additionally, a heat cycle test was performed on the samples judged acceptable as described above in terms of the room-temperature specific resistance and the B-constant and on a comparative sample (Sample No. 1).

In this experimental example, the heat cycle test was performed by repeatedly increasing/decreasing temperature 1000 times in the temperature range of about −25° C. to about 180° C., and the samples were determined acceptable when a resistance change rate before and after the test was about 10% or less. The results are shown together in Tables 1 to 3.

TABLE 1

| | Sample No. | Composition $Ca_{x'}$·$Na_x$$Mn_{y'}$·$M_y$$O_{12}$ | | | | | Specific Resistance (Ω · cm) | B-constant | Electric Characteristic Evaluation Result Reliability Test |
|---|---|---|---|---|---|---|---|---|---|
| | | x' | x | y' | M | y | | | |
| * | 1 | 1.00 | 0.00 | 7.00 | — | 0.00 | 95.89 | 78600 | X |
|   | 2 | 0.97 | 0.03 | 7.00 | — | 0.00 | 48.70 | 67000 | ○ |
|   | 3 | 0.95 | 0.05 | 7.00 | — | 0.00 | 45.60 | 72000 | ○ |
|   | 4 | 0.90 | 0.10 | 7.00 | — | 0.00 | 31.00 | 79000 | ○ |
|   | 5 | 0.80 | 0.20 | 7.00 | — | 0.00 | 35.60 | 68000 | ○ |
| * | 6 | 0.70 | 0.30 | 7.00 | — | 0.00 | 106.00 | 12000 | — |
| * | 7 | 1.00 | 0.00 | 6.95 | Cu | 0.05 | 11.60 | 21000 | X |
|   | 8 | 0.97 | 0.03 | 6.95 | Cu | 0.05 | 13.50 | 36000 | ○ |
|   | 9 | 0.90 | 0.10 | 6.95 | Cu | 0.05 | 9.67 | 41000 | ○ |
|   | 10 | 0.80 | 0.20 | 6.95 | Cu | 0.05 | 11.50 | 38000 | ○ |
| * | 11 | 0.70 | 0.30 | 6.95 | Cu | 0.05 | 110.00 | 11500 | — |
| * | 12 | 1.00 | 0.00 | 6.90 | Cu | 0.10 | 6.80 | 18000 | X |
|   | 13 | 0.97 | 0.03 | 6.90 | Cu | 0.10 | 6.50 | 21000 | ○ |
|   | 14 | 0.90 | 0.10 | 6.90 | Cu | 0.10 | 4.30 | 22000 | ○ |
|   | 15 | 0.80 | 0.20 | 6.90 | Cu | 0.10 | 4.40 | 23500 | ○ |
| * | 16 | 0.70 | 0.30 | 6.90 | Cu | 0.10 | 25.00 | 11500 | X |
| * | 17 | 1.00 | 0.00 | 6.80 | Cu | 0.20 | 3.10 | 8000 | X |
|   | 18 | 0.97 | 0.03 | 6.80 | Cu | 0.20 | 2.90 | 10000 | ○ |
|   | 19 | 0.90 | 0.10 | 6.80 | Cu | 0.20 | 2.20 | 11000 | ○ |
|   | 20 | 0.80 | 0.20 | 6.80 | Cu | 0.20 | 3.60 | 10000 | ○ |
| * | 21 | 0.70 | 0.30 | 6.80 | Cu | 0.20 | 15.00 | 8200 | X |
| * | 22 | 1.00 | 0.00 | 6.75 | Cu | 0.25 | 1.20 | 4000 | X |
|   | 23 | 0.97 | 0.03 | 6.75 | Cu | 0.25 | 1.30 | 7300 | ○ |
|   | 24 | 0.90 | 0.10 | 6.75 | Cu | 0.25 | 1.30 | 7500 | ○ |
|   | 25 | 0.80 | 0.20 | 6.75 | Cu | 0.25 | 1.20 | 7200 | ○ |
| * | 26 | 0.70 | 0.30 | 6.75 | Cu | 0.25 | 5.90 | 5400 | X |
| * | 27 | 1.00 | 0.00 | 6.72 | Cu | 0.28 | 0.90 | 2800 | X |
|   | 28 | 0.97 | 0.03 | 6.72 | Cu | 0.28 | 0.90 | 5600 | ○ |
|   | 29 | 0.90 | 0.10 | 6.72 | Cu | 0.28 | 0.80 | 6000 | ○ |
|   | 30 | 0.80 | 0.20 | 6.72 | Cu | 0.28 | 0.90 | 5500 | ○ |
| * | 31 | 0.70 | 0.30 | 6.72 | Cu | 0.28 | 6.60 | 4300 | X |
| * | 32 | 1.00 | 0.00 | 6.70 | Cu | 0.30 | 0.38 | 1800 | X |
|   | 33 | 0.97 | 0.03 | 6.70 | Cu | 0.30 | 0.50 | 2300 | ○ |
|   | 34 | 0.80 | 0.20 | 6.70 | Cu | 0.30 | 0.60 | 2200 | ○ |
| * | 35 | 0.70 | 0.30 | 6.70 | Cu | 0.30 | 2.30 | 2100 | X |
| * | 36 | 1.00 | 0.00 | 6.65 | Cu | 0.35 | 0.30 | 1500 | X |
|   | 37 | 0.97 | 0.03 | 6.65 | Cu | 0.35 | 0.40 | 2300 | ○ |
|   | 38 | 0.80 | 0.20 | 6.65 | Cu | 0.35 | 0.40 | 2200 | ○ |
| * | 39 | 0.70 | 0.30 | 6.65 | Cu | 0.35 | 3.10 | 2100 | X |
| * | 40 | 0.90 | 0.10 | 6.60 | Cu | 0.40 | 0.23 | 1800 | — |
| * | 41 | 1.00 | 0.00 | 6.95 | Ni | 0.05 | 15.30 | 18200 | X |
|   | 42 | 0.97 | 0.03 | 6.95 | Ni | 0.05 | 16.20 | 25000 | ○ |
|   | 43 | 0.90 | 0.10 | 6.95 | Ni | 0.05 | 15.30 | 31000 | ○ |
|   | 44 | 0.80 | 0.20 | 6.95 | Ni | 0.05 | 16.90 | 26000 | ○ |
| * | 45 | 0.70 | 0.30 | 6.95 | Ni | 0.05 | 103.00 | 13000 | — |
| * | 46 | 1.00 | 0.00 | 6.90 | Ni | 0.10 | 7.30 | 11000 | X |
|   | 47 | 0.97 | 0.03 | 6.90 | Ni | 0.10 | 8.20 | 21000 | ○ |
|   | 48 | 0.90 | 0.10 | 6.90 | Ni | 0.10 | 9.10 | 22000 | ○ |
|   | 49 | 0.80 | 0.20 | 6.90 | Ni | 0.10 | 8.10 | 21000 | ○ |
| * | 50 | 0.70 | 0.30 | 6.90 | Ni | 0.10 | 59.20 | 12500 | — |

TABLE 2

| Sample No. | Composition $Ca_{x'}\bullet Na_x Mn_{y'}\bullet M_y O_{12}$ | | | | | Electric Characteristic Evaluation Result | | Reliability Test |
|---|---|---|---|---|---|---|---|---|
| | x' | x | y' | M | y | Specific Resistance ($\Omega\cdot cm$) | B-constant | |
| * 51 | 1.00 | 0.00 | 6.80 | Ni | 0.20 | 3.20 | 7500 | X |
| 52 | 0.97 | 0.03 | 6.80 | Ni | 0.20 | 3.10 | 10000 | ○ |
| 53 | 0.90 | 0.10 | 6.80 | Ni | 0.20 | 2.90 | 11000 | ○ |
| 54 | 0.80 | 0.20 | 6.80 | Ni | 0.20 | 2.90 | 10500 | ○ |
| * 55 | 0.70 | 0.30 | 6.80 | Ni | 0.20 | 15.60 | 7900 | X |
| * 56 | 1.00 | 0.00 | 6.75 | Ni | 0.25 | 2.30 | 4200 | X |
| 57 | 0.97 | 0.03 | 6.75 | Ni | 0.25 | 2.10 | 7100 | ○ |
| 58 | 0.90 | 0.10 | 6.75 | Ni | 0.25 | 2.00 | 7200 | ○ |
| 59 | 0.80 | 0.20 | 6.75 | Ni | 0.25 | 2.20 | 7300 | ○ |
| * 60 | 0.70 | 0.30 | 6.75 | Ni | 0.25 | 8.50 | 5300 | X |
| * 61 | 1.00 | 0.00 | 6.65 | Ni | 0.35 | 0.38 | 2000 | X |
| 62 | 0.97 | 0.03 | 6.65 | Ni | 0.35 | 0.45 | 2100 | ○ |
| 63 | 0.90 | 0.10 | 6.65 | Ni | 0.35 | 0.42 | 2250 | ○ |
| 64 | 0.80 | 0.20 | 6.65 | Ni | 0.35 | 0.38 | 2100 | ○ |
| * 65 | 0.70 | 0.30 | 6.65 | Ni | 0.35 | 0.98 | 2000 | X |
| * 66 | 1.00 | 0.00 | 6.60 | Ni | 0.40 | 1.90 | 3000 | — |
| * 67 | 0.90 | 0.10 | 6.60 | Ni | 0.40 | 1.30 | 1450 | — |
| * 68 | 0.80 | 0.20 | 6.60 | Ni | 0.40 | 1.40 | 1400 | — |
| * 69 | 0.70 | 0.30 | 6.60 | Ni | 0.40 | 6.80 | 1000 | — |

TABLE 3

| Sample No. | Composition $Ca_{x'}\bullet Na_x Mn_{y'}\bullet M_y O_{12}$ | | | | | | Electric Characteristic Evaluation Result | | Reliability Test |
|---|---|---|---|---|---|---|---|---|---|
| | x' | x | y' | M | y | $(y_1, y_2)$ | Specific Resistance ($\Omega\cdot cm$) | B-constant | |
| 70 | 0.90 | 0.10 | 6.95 | Cu, Ni | 0.05 | (0.025, 0.025) | 10.20 | 38000 | ○ |
| 71 | 0.90 | 0.10 | 6.95 | Cu, Ni | 0.05 | (0.04, 0.01) | 11.50 | 38500 | ○ |
| 72 | 0.90 | 0.10 | 6.95 | Cu, Ni | 0.05 | (0.01, 0.04) | 10.90 | 34000 | ○ |
| 73 | 0.90 | 0.10 | 6.65 | Cu, Ni | 0.35 | (0.30, 0.05) | 0.48 | 2100 | ○ |
| 74 | 0.90 | 0.10 | 6.65 | Cu, Ni | 0.35 | (0.20, 0.15) | 0.48 | 2150 | ○ |
| 75 | 0.90 | 0.10 | 6.65 | Cu, Ni | 0.35 | (0.05, 0.30) | 0.47 | 2150 | ○ |

In Tables 1 to 3, the samples marked with "*" are those outside the scope of the present invention (Comparative Example). In the column of "M", "-" indicates the absence of M. In the column of "Reliability Test", "○" indicates acceptance, "x" indicates rejection, and "-" indicates that the heat cycle test was not performed (the same applies to Tables 4 to 5).

Among the samples evaluated as described above, the CTR characteristics of Sample Nos. 1, 4, 7, 9, 12, and 14 are exemplarily shown in FIGS. 2 to 6.

Figure 2:
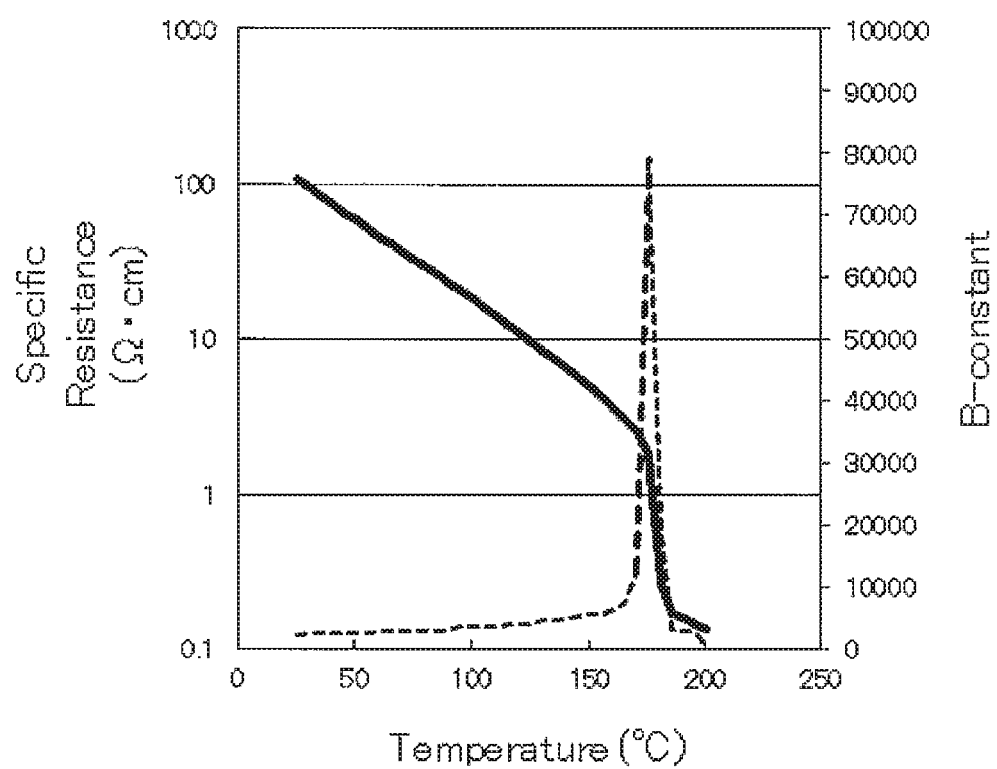
FIG. 2 is a graph of CTR characteristics of Sample No. 1 (Comparative Example) in Experimental Example, including a solid line indicative of a specific resistance and a dotted line indicative of a B-constant.
Figure 3:
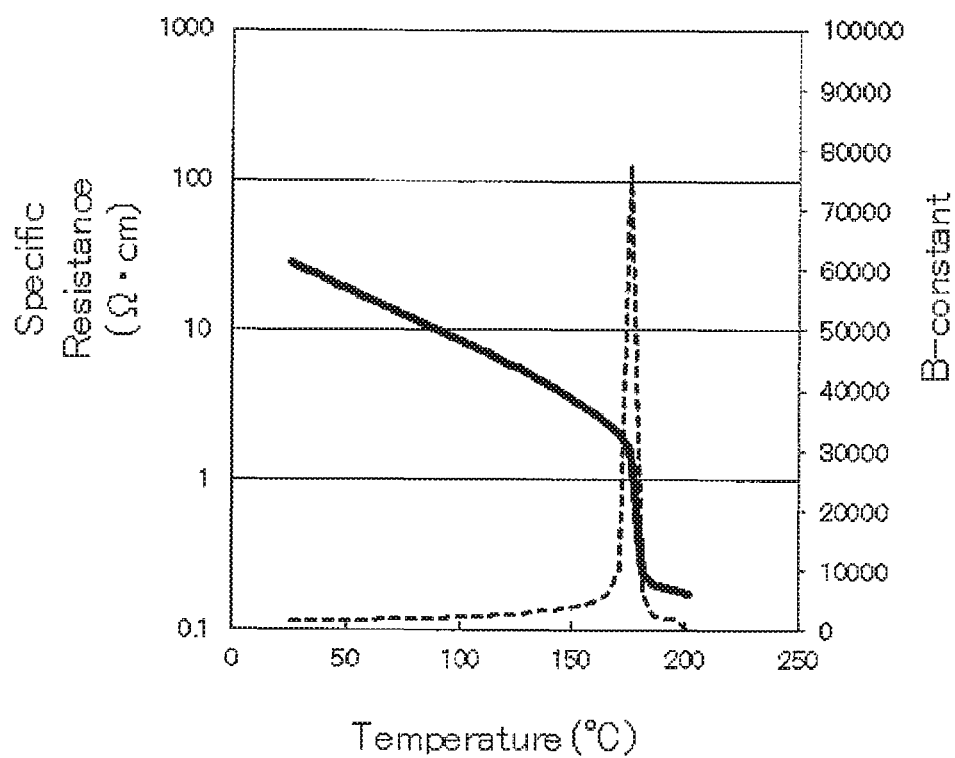
FIG. 3 is a graph of CTR characteristics of Sample No. 4 (Example) in Experimental Example, including a solid line indicative of a specific resistance and a dotted line indicative of a B-constant.
Figure 4:
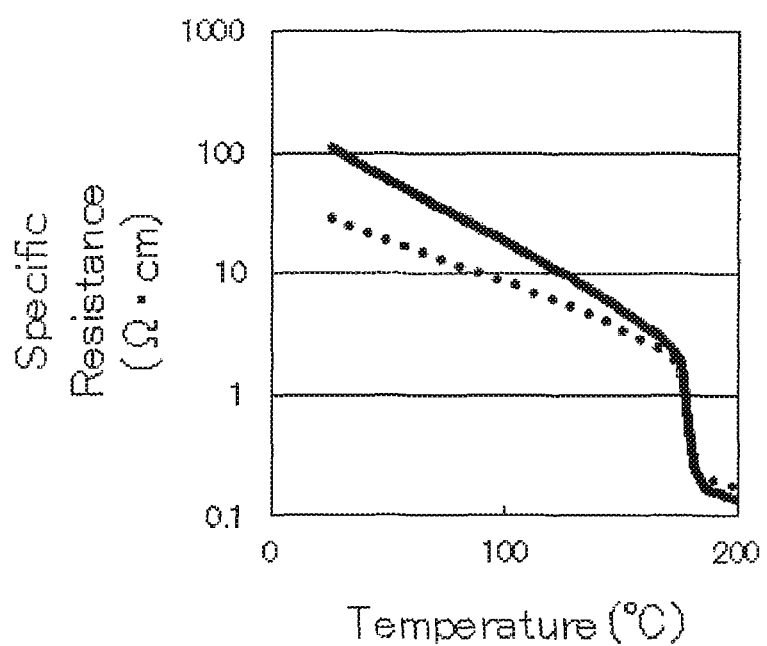
FIG. 4 is a graph of CTR characteristics of Sample Nos. 1 and 4 in Experimental Example, including a solid line indicative of the specific resistance of Sample No. 1 (Comparative Example) and a dotted line indicative of the specific resistance of Sample No. 4 (Example).

Referring to FIG. 2, it can be seen that the sample of Sample No. 1 ($CaMn_7O_{12}$) has a room-temperature specific resistance higher than about 100 $\Omega\cdot cm$, transitions from an insulator to a metallic state at around about 180° C., and exhibits a steep resistance change. Referring to FIGS. 2 to 4 and Tables 1 to 3, the sample of Sample No. 4 within the scope of the present invention (sample having a portion of the Ca site substituted with Na) had the steepness of resistance change (B-constant) almost as high as that of the sample of Sample No. 1. However, Sample No. 4 had a low room-temperature specific resistance of about 50 $\Omega\cdot cm$ or less. It is therefore understood that Sample No. 4 has a low room-temperature specific resistance and achieves a steep resistance change (high B-constant). To reduce the room-temperature specific resistance while maintaining the steepness of resistance change, as apparent from the results of Sample Nos. 2 to 5 in Table 1, it is understood that substituting a portion of the Ca site with Na to set an Na amount x to about 0.03 or more and less than about 0.3, and preferably about 0.2 or less is effective. Although not described herein, the transition temperature was substantially the same as the transition temperature of Sample No. 1 without the addition of Na regardless of the Na amount (x).

Figure 5:
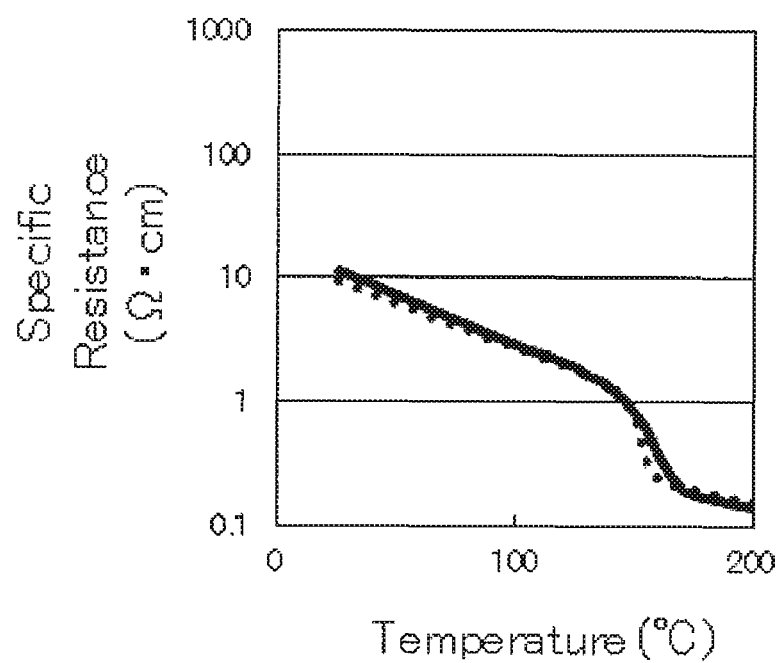
FIG. 5 is a graph of CTR characteristics of Sample Nos. 7 and 9 in Experimental Example, including a solid line indicative of the specific resistance of Sample No. 7 (Comparative Example) and a dotted line indicative of the specific resistance of Sample No. 9 (Example).
Figure 6:
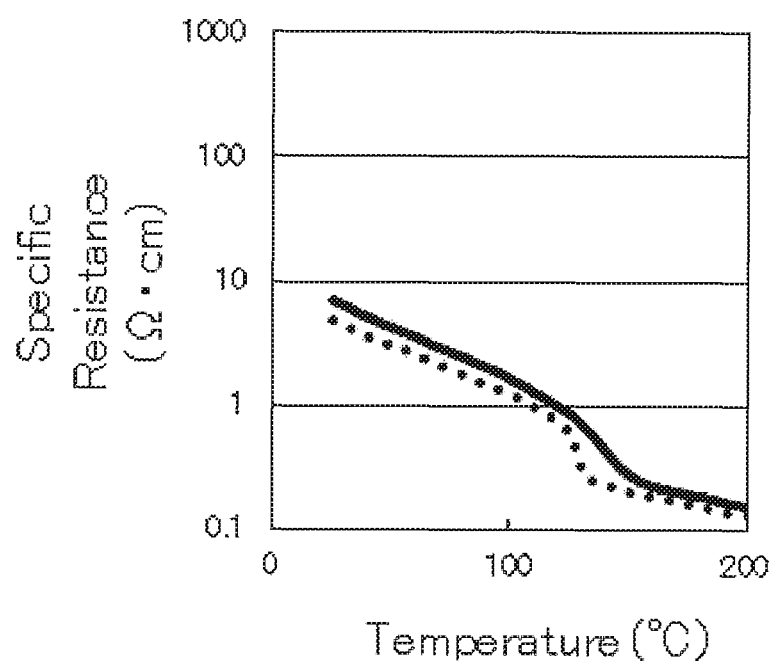
FIG. 6 is a graph of CTR characteristics of Sample Nos. 12 and 14 in Experimental Example, including a solid line indicative of the specific resistance of Sample No. 12 (Comparative Example) and a dotted line indicative of the specific resistance of Sample No. 14 (Example).

Focusing attention on samples that were codoped with Na and Cu, it is understood from FIGS. 5 to 6 that the transition temperature is able to be shifted to a low temperature by adding Cu. On the other hand, as described in Tables 1 to 3, the B-constant tends to be smaller as compared to the case in which no Cu is added. However, an effect of improving the B-constant is able to be achieved by codoping with Na and Cu and adjusting the additive amounts thereof. As apparent from FIGS. 5 to 6 and Tables 1 to 3, it is understood that by setting the Na amount x to about 0.03 or more and less than about 0.3, and preferably about 0.2 or less, and a Cu amount y to about 0.35 or less, preferably about 0.3 or less, and more preferably about 0.2 or less, a low room-temperature specific resistance and a steep resistance change (high B-constant) are achieved.

Furthermore, focusing attention on the reliability evaluation (heat cycle test result) and referring to Tables 1 to 3, the comparative samples of Sample Nos. 1 and 7 have a resistance change rate exceeding about 10% before and after the test and a low reliability and, in contrast, the resistance change rate was suppressed to about 10% or less in the sample to which Na was added.

From the above experiments, it is confirmed that the samples within the scope of the present invention have a sufficiently low room-temperature specific resistance, show a high B-constant, and exhibit excellent heat cycle resistance.

Although the mechanism producing such effects is not entirely clear, the following mechanism may be conceivable. The steep resistance change in the $CaMn_7O_{12}$ system is derived from the formation and disruption of a charge-ordered state of $Mn^{3+}$-$Mn^{4+}$ and, it is conceivable that when the charge-ordered state is disturbed, the steep resistance change deteriorates (the B-constant decreases). It is inferred that by substituting the divalent Ca site, rather than the Mn site significantly affecting the charge order, with a monovalent Na site, preferred embodiments of the present invention enable injection of holes without causing disturbance in the charge order of Mn, thus resulting in the reduction in the specific resistance at room temperature and the maintenance of the high B-constant.

A rise in the room temperature resistance generated in the heat cycle is possibly affected by the generation of oxygen deficiency, and it is conceivable that unstable oxygen is lost during the heat cycle test, causing a change in the amount of oxygen deficiency. Actually, the resistance tends to increase due to the heat cycle, and it is inferred that the formation of the oxygen deficiency reduces an amount of holes. In contrast, it is inferred that when the holes are generated as in preferred embodiments of the present invention, the charge is compensated and is not recognized as a significant resistance change even if the amount of oxygen deficiency is changed by the heat cycle.

Experimental Example 2

This experimental example relates to the case of X and Y not satisfying X/Y=1.0/7.0, in other words, when the composition ratio of the ceramic material is intentionally shifted away from the ideal composition represented by $Ca_{1-x}Na_xMn_{7-y}M_yO_{12}$, and is shown as a comparison with the ideal composition.

Samples were produced in the same or substantially the same m as Experimental Example 1, except that the raw materials were weighed so as to achieve the composition of Tables 4 to 5 after firing, and were evaluated in terms of the electric characteristics and the reliability. The results are shown together in Tables 4 to 5.

TABLE 4

| | Sample No. | Composition $Ca_{x'}$•$Na_x$$Mn_{y'}$•$M_yO_{12}$ | | | | | | | Electric Characteristic Evaluation Result | | Reliability Test |
|---|---|---|---|---|---|---|---|---|---|---|---|
| | | x' | x | y' | M | y | X | Y | Specific Resistance ($\Omega \cdot cm$) | B-constant | |
| * | 76 | 1.00 | 0.00 | 7.00 | Cu | 0.00 | 1.00 | 7.00 | 95.89 | 78600 | X |
| | 77 | 0.98 | 0.00 | 7.00 | Cu | 0.00 | 0.98 | 7.00 | 48.90 | 72000 | ○ |
| | 78 | 0.90 | 0.00 | 7.00 | Cu | 0.00 | 0.90 | 7.00 | 48.10 | 70000 | ○ |
| * | 79 | 0.80 | 0.00 | 7.00 | Cu | 0.00 | 0.80 | 7.00 | 45.20 | 65000 | X |
| | 80 | 1.00 | 0.00 | 6.98 | Cu | 0.00 | 1.00 | 6.98 | 49.50 | 72000 | ○ |
| | 81 | 1.00 | 0.00 | 6.90 | Cu | 0.00 | 1.00 | 6.90 | 48.60 | 73200 | ○ |
| * | 82 | 1.00 | 0.00 | 6.80 | Cu | 0.00 | 1.00 | 6.80 | 42.30 | 67000 | X |
| | 83 | 0.97 | 0.03 | 7.00 | Cu | 0.00 | 1.00 | 7.00 | 48.70 | 67000 | ○ |
| | 84 | 0.95 | 0.03 | 7.00 | Cu | 0.00 | 0.98 | 7.00 | 45.10 | 62000 | ○ |
| | 85 | 0.87 | 0.03 | 7.00 | Cu | 0.00 | 0.90 | 7.00 | 41.60 | 58000 | ○ |
| * | 86 | 0.77 | 0.03 | 7.00 | Cu | 0.00 | 0.80 | 7.00 | 39.40 | 59500 | X |
| | 87 | 0.97 | 0.03 | 6.98 | Cu | 0.00 | 1.00 | 6.98 | 43.20 | 60000 | ○ |
| | 88 | 0.97 | 0.03 | 6.90 | Cu | 0.00 | 1.00 | 6.90 | 43.90 | 62000 | ○ |
| * | 89 | 0.97 | 0.03 | 6.80 | Cu | 0.00 | 1.00 | 6.80 | 40.70 | 48000 | X |
| | 90 | 0.90 | 0.10 | 7.00 | Cu | 0.00 | 1.00 | 7.00 | 31.00 | 79000 | ○ |
| | 91 | 0.88 | 0.10 | 7.00 | Cu | 0.00 | 0.98 | 7.00 | 29.50 | 65000 | ○ |
| | 92 | 0.80 | 0.10 | 7.00 | Cu | 0.00 | 0.90 | 7.00 | 28.00 | 71000 | ○ |
| * | 93 | 0.70 | 0.10 | 7.00 | Cu | 0.00 | 0.80 | 7.00 | 29.60 | 58000 | X |
| | 94 | 0.90 | 0.10 | 6.98 | Cu | 0.00 | 1.00 | 6.98 | 30.10 | 69000 | ○ |
| | 95 | 0.90 | 0.10 | 6.90 | Cu | 0.00 | 1.00 | 6.90 | 27.20 | 65500 | ○ |
| * | 96 | 0.90 | 0.10 | 6.80 | Cu | 0.00 | 1.00 | 6.80 | 26.90 | 69000 | X |
| | 97 | 0.80 | 0.20 | 7.00 | Cu | 0.00 | 1.00 | 7.00 | 35.60 | 68000 | ○ |
| | 98 | 0.78 | 0.20 | 7.00 | Cu | 0.00 | 0.98 | 7.00 | 29.50 | 59000 | ○ |
| | 99 | 0.70 | 0.20 | 7.00 | Cu | 0.00 | 0.90 | 7.00 | 32.30 | 50000 | ○ |
| * | 100 | 0.60 | 0.20 | 7.00 | Cu | 0.00 | 0.80 | 7.00 | 30.80 | 49555 | X |
| | 101 | 0.80 | 0.20 | 6.98 | Cu | 0.00 | 1.00 | 6.98 | 31.50 | 52000 | ○ |
| | 102 | 0.80 | 0.20 | 6.90 | Cu | 0.00 | 1.00 | 6.90 | 32.10 | 53500 | ○ |
| * | 103 | 0.80 | 0.20 | 6.80 | Cu | 0.00 | 1.00 | 6.80 | 30.70 | 49000 | X |
| * | 104 | 0.70 | 0.30 | 7.00 | Cu | 0.00 | 1.00 | 7.00 | 106.00 | 12000 | X |
| * | 105 | 1.00 | 0.00 | 6.95 | Cu | 0.05 | 1.00 | 7.00 | 11.60 | 21000 | X |
| | 106 | 0.98 | 0.00 | 6.95 | Cu | 0.05 | 0.98 | 7.00 | 10.20 | 20500 | ○ |
| | 107 | 0.90 | 0.00 | 6.95 | Cu | 0.05 | 0.90 | 7.00 | 10.30 | 20000 | ○ |
| * | 108 | 0.80 | 0.00 | 6.95 | Cu | 0.05 | 0.80 | 7.00 | 11.50 | 21000 | X |
| | 109 | 1.00 | 0.00 | 6.93 | Cu | 0.05 | 1.00 | 6.98 | 12.30 | 20500 | ○ |
| | 110 | 1.00 | 0.00 | 6.85 | Cu | 0.05 | 1.00 | 6.90 | 11.00 | 22000 | ○ |
| * | 111 | 1.00 | 0.00 | 6.75 | Cu | 0.05 | 1.00 | 6.80 | 10.80 | 20000 | X |
| * | 112 | 1.00 | 0.00 | 6.80 | Cu | 0.20 | 1.00 | 7.00 | 3.10 | 8000 | X |

TABLE 4-continued

| Sample No. | Composition $Ca_{x'}\cdot Na_x Mn_{y'}\cdot M_y O_{12}$ | | | | | | Electric Characteristic Evaluation Result | | Reliability Test |
|---|---|---|---|---|---|---|---|---|---|
| | x' | x | y' | M | y | X | Y | Specific Resistance (Ω · cm) | B-constant | |
| 113 | 0.98 | 0.00 | 6.80 | Cu | 0.20 | 0.98 | 7.00 | 2.50 | 6200 | ○ |
| 114 | 0.90 | 0.00 | 6.80 | Cu | 0.20 | 0.90 | 7.00 | 2.60 | 7000 | ○ |
| * 115 | 0.80 | 0.00 | 6.80 | Cu | 0.20 | 0.80 | 7.00 | 3.00 | 5000 | X |
| 116 | 1.00 | 0.00 | 6.78 | Cu | 0.20 | 1.00 | 6.98 | 2.70 | 5200 | ○ |
| 117 | 1.00 | 0.00 | 6.70 | Cu | 0.20 | 1.00 | 6.90 | 2.10 | 51000 | ○ |
| * 118 | 1.00 | 0.00 | 6.60 | Cu | 0.20 | 1.00 | 6.80 | 2.50 | 4900 | X |
| * 119 | 1.00 | 0.00 | 6.65 | Cu | 0.35 | 1.00 | 7.00 | 0.30 | 1800 | X |
| 120 | 0.98 | 0.00 | 6.65 | Cu | 0.35 | 0.98 | 7.00 | 0.28 | 2000 | ○ |
| 121 | 0.90 | 0.00 | 6.65 | Cu | 0.35 | 0.90 | 7.00 | 0.30 | 2100 | ○ |
| * 122 | 0.80 | 0.00 | 6.65 | Cu | 0.35 | 0.80 | 7.00 | 0.22 | 1800 | X |
| 123 | 1.00 | 0.00 | 6.63 | Cu | 0.35 | 1.00 | 6.98 | 0.23 | 2100 | ○ |
| 124 | 1.00 | 0.00 | 6.55 | Cu | 0.35 | 1.00 | 6.90 | 0.25 | 2000 | ○ |
| * 125 | 1.00 | 0.00 | 6.45 | Cu | 0.35 | 1.00 | 6.80 | 0.29 | 1900 | X |

TABLE 5

| Sample No. | Composition $Ca_{x'}\cdot Na_x Mn_{y'}\cdot M_y O_{12}$ | | | | | | Electric Characteristic Evaluation Result | | Reliability Test |
|---|---|---|---|---|---|---|---|---|---|
| | x' | x | y' | M | y | X | Y | Specific Resistance (Ω · cm) | B-constant | |
| * 126 | 1.00 | 0.00 | 6.60 | Cu | 0.40 | 1.00 | 7.00 | 0.18 | 1400 | X |
| 127 | 0.90 | 0.10 | 6.80 | Cu | 0.20 | 1.00 | 7.00 | 2.20 | 11000 | ○ |
| 128 | 0.88 | 0.10 | 6.80 | Cu | 0.20 | 0.98 | 7.00 | 2.10 | 10000 | ○ |
| 129 | 0.80 | 0.10 | 6.80 | Cu | 0.20 | 0.90 | 7.00 | 2.00 | 9500 | ○ |
| * 130 | 0.70 | 0.10 | 6.80 | Cu | 0.20 | 0.80 | 7.00 | 1.90 | 10000 | X |
| 131 | 0.90 | 0.10 | 6.78 | Cu | 0.20 | 1.00 | 6.98 | 2.20 | 10500 | ○ |
| 132 | 0.90 | 0.10 | 6.70 | Cu | 0.20 | 1.00 | 6.90 | 2.50 | 10000 | ○ |
| 133 | 0.80 | 0.20 | 6.95 | Cu | 0.05 | 1.00 | 7.00 | 11.50 | 38000 | ○ |
| 134 | 0.78 | 0.20 | 6.95 | Cu | 0.05 | 0.98 | 7.00 | 10.20 | 35000 | ○ |
| 135 | 0.70 | 0.20 | 6.95 | Cu | 0.05 | 0.90 | 7.00 | 10.10 | 34500 | ○ |
| * 136 | 0.60 | 0.20 | 6.95 | Cu | 0.05 | 0.80 | 7.00 | 11.20 | 30000 | X |
| 137 | 0.80 | 0.20 | 6.93 | Cu | 0.05 | 1.00 | 6.98 | 10.80 | 32500 | ○ |
| 138 | 0.80 | 0.20 | 6.85 | Cu | 0.05 | 1.00 | 6.90 | 11.00 | 33000 | ○ |
| * 139 | 0.80 | 0.20 | 6.75 | Cu | 0.05 | 1.00 | 6.80 | 10.60 | 30000 | X |
| 140 | 0.97 | 0.03 | 6.65 | Cu | 0.35 | 1.00 | 7.00 | 0.40 | 2300 | ○ |
| 141 | 0.95 | 0.03 | 6.65 | Cu | 0.35 | 0.98 | 7.00 | 0.38 | 2100 | ○ |
| 142 | 0.87 | 0.03 | 6.65 | Cu | 0.35 | 0.90 | 7.00 | 0.39 | 2150 | ○ |
| * 143 | 0.77 | 0.03 | 6.65 | Cu | 0.35 | 0.80 | 7.00 | 0.40 | 2000 | X |
| 144 | 0.97 | 0.03 | 6.63 | Cu | 0.35 | 1.00 | 6.98 | 0.35 | 2200 | ○ |
| 145 | 0.97 | 0.03 | 6.55 | Cu | 0.35 | 1.00 | 6.90 | 0.38 | 2100 | ○ |
| * 146 | 0.97 | 0.03 | 6.45 | Cu | 0.35 | 1.00 | 6.80 | 0.35 | 2000 | X |

As described in Tables 4 to 5, it was confirmed that by intentionally shifting the X/Y ratio away from the ratio of 1.0/7.0 in the ideal composition, the samples without the addition of Na are able to have a sufficiently low room-temperature specific resistance, show a high B-constant, and exhibit excellent heat cycle resistance. This has the effect of generating holes due to the generation of cation defects in the same or similar manner as Na and, although the mechanism producing such an effect is not clear, it is inferred that the characteristics are improved by the same or similar mechanism as that described in Experimental Example 1. As described in Tables 4 to 5, it is confirmed that even in the samples to which Na was added, the same or similar effects are achieved by intentionally shifting the X/Y ratio away from the ratio of 1.0/7.0 in the ideal composition and that the samples have a sufficiently low room-temperature specific resistance, show a high B-constant, and exhibit excellent heat cycle resistance. However, if the ratio is shifted too much away from the ideal composition, the reliability tends to decrease and, although not intended to limit the present invention, it is considered that the reliability is affected by formation of different phases due to the compositional shift. From the results of Tables 4 to 5, it is understood that excellent effects are achieved by setting X/Y to about 0.9/7.0 or more and about 1.0/6.9 or less, excluding 1.0/7.0, for example.

Although ceramic materials according to preferred embodiments of the present invention may be used as a material for an inrush-current suppressing thermistor element, the present invention is not limited only to such application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic material having a composition represented by $Ca_{x'}Na_xMn_{y'}M_yO_{12}$, wherein
M denotes at least one of Ni and Cu; and
x', x, y', and y satisfy any of the following formulae (a), (b), and (c) in which x'+x=X and y'+y=Y:

$$\frac{0.9}{7.0} \leq \frac{X}{Y} < \frac{1.0}{7.0};$$ (a)

at a condition of $$\frac{X}{Y} = \frac{1.0}{7.0}, \frac{0.03}{8} \leq \frac{x}{X+Y} < \frac{0.30}{8} \text{ and}$$
$$0 \leq \frac{y}{X+Y} \leq \frac{0.35}{8}; \text{ and}$$ (b)

$$\frac{1.0}{7.0} < \frac{X}{Y} \leq \frac{1.0}{6.9}.$$ (c)

2. A resistive element comprising:
an element body; and
at least two electrodes provided with at least a portion of the element body interposed therebetween; wherein
the element body is composed of the ceramic material according to claim 1.

3. The resistive element according to claim 2, wherein the resistive element is a thermistor element that suppresses an inrush current.

4. The resistive element according to claim 2, wherein
the element body has a plate shape; and
the two electrodes are provided on respective principal surfaces of the plate-shaped element body and opposed to each other.

5. The resistive element according to claim 4, wherein the element body has a disc shape.

6. The resistive element according to claim 2, wherein a lead wire is connected to each of the at least two electrodes via solder.

7. A ceramic material comprising:
a composite oxide of Ca, Na, Mn, and M, with M representing at least one of Ni and Cu; wherein
x', x, y', and y denote a Ca-containing molar portion, an Na-containing molar portion, an Mn-containing molar portion, and an M-containing molar portion, respectively, and x'+x=X and y'+y=Y, the ceramic material satisfies any of (a), (b), and (c):

$$\frac{0.9}{7.0} \leq \frac{X}{Y} < \frac{1.0}{7.0};$$ (a)

at a condition of $$\frac{X}{Y} = \frac{1.0}{7.0}, \frac{0.03}{8} \leq \frac{x}{X+Y} < \frac{0.30}{8} \text{ and}$$
$$0 \leq \frac{y}{X+Y} \leq \frac{0.35}{8}; \text{ and}$$ (b)

$$\frac{1.0}{7.0} < \frac{X}{Y} \leq \frac{1.0}{6.9}.$$ (c)

8. A resistive element comprising:
an element body; and
at least two electrodes provided with at least a portion of the element body interposed therebetween; wherein
the element body is composed of the ceramic material according to claim 7.

9. The resistive element according to claim 8, wherein the resistive element is a thermistor element that suppresses an inrush current.

10. The resistive element according to claim 8, wherein
the element body has a plate shape; and
the two electrodes are provided on respective principal surfaces of the plate-shaped element body to be opposed to each other.

11. The resistive element according to claim 10, wherein the element body has a disc shape.

12. The resistive element according to claim 8, wherein a lead wire is connected to each of the at least two electrodes via solder.

* * * * *